Jan. 1, 1935.   C. L. MATTISON ET AL   1,986,005
ABRADING MACHINE
Filed March 21, 1930   7 Sheets-Sheet 2

Inventors
Carl L. Mattison
Louis T. Medholdt

Jan. 1, 1935. C. L. MATTISON ET AL 1,986,005
ABRADING MACHINE
Filed March 21, 1930 7 Sheets-Sheet 3

Inventors
Carl L. Mattison
Louis T. Medholdt

Jan. 1, 1935. C. L. MATTISON ET AL 1,986,005
ABRADING MACHINE
Filed March 21, 1930 7 Sheets-Sheet 7

Inventors
Carl L. Mattison
Louis T. Medholdt

Patented Jan. 1, 1935

1,986,005

UNITED STATES PATENT OFFICE 1,986,005

ABRADING MACHINE

Carl Lawrence Mattison and Louis T. Medholdt, Rockford, Ill., assignors to Mattison Machine Works, Rockford, Ill., a corporation of Illinois Application March 21, 1930, Serial No. 437,637

9 Claims. (Cl. 51—154)

The general object of this invention is to produce a machine of a distinctly new type which is especially suited for sanding or smoothing pieces of work having circular or approximately circular contour such as the legs and similar parts of furniture; and in pursuance of this general object the invention aims to provide a machine in which the pieces of work are supported and rotated on a fixed axis coincident with the axis of the work, and in which a series of abrading or sanding devices are successively moved into engagement with the rotating work so that the work will remain constantly in view of the operator and successive pieces of work may be conveniently fed to and discharged from the work-holding and rotating mechanism.

Another object of the invention is to provide in a machine of this character novel means for mounting the series of sanding devices and for causing them to be successively brought into play upon the piece of work.

A further object is to provide a machine of this character which is fully automatic in operation and which is arranged to take successive pieces of work from an initial support, to present each piece of work in position to be operated upon, to clamp the work between rotary spindles, to automatically start rotation of the work, and to automatically stop rotation thereof and discharge the work from the machine after a predetermined length of time or a predetermined number of the sanding devices have acted upon the work.

A more specific object of the invention is to produce a machine of this character in which the abrading mechanism comprises a plurality of separate sanding units mounted on a carrier to travel in endless paths, each device comprising a broom-like backing and a sheet or series of strips of sand-paper extending along the outer face of such backing and arranged to be yieldably pressed against a rotating piece of work in such a manner that the sanding surface will be permitted to conform to any longitudinally irregular contour of the work.

In pursuance of the foregoing object the invention aims to provide novel means for mounting each broom and sand-paper facing on its carrier, which means permits of wide latitude of adjustment of the sanding devices on the carrier, and to provide as a part of this mounting means a magazine for a roll of sand-paper and means by which a fresh section of the sand-paper on said roll may be quickly placed in operative relation to the brooms for renewal purposes.

Another object of the invention is to provide means by which the work-holding and driving spindle may be reversely driven without driving the sanding devices carrier, so as to permit the operator to operate upon the work with a cutting tool whenever necessary to touch up special rough spots or sharpen the contour of the edges or designs on the pieces of work.

Other specific and ancillary objects relating to particular parts or mechanisms of the machine and looking toward the accomplishment of the foregoing objects will be understood from the following detailed description of the preferred embodiment of the invention taken in connection with the accompanying drawings.

In the drawings,

Fig. 8 (Sheet 3) is a detail plan view of the means for controlling the driving motor and the clutch by which the rotary sanding drum structure is driven.

Figure 1:
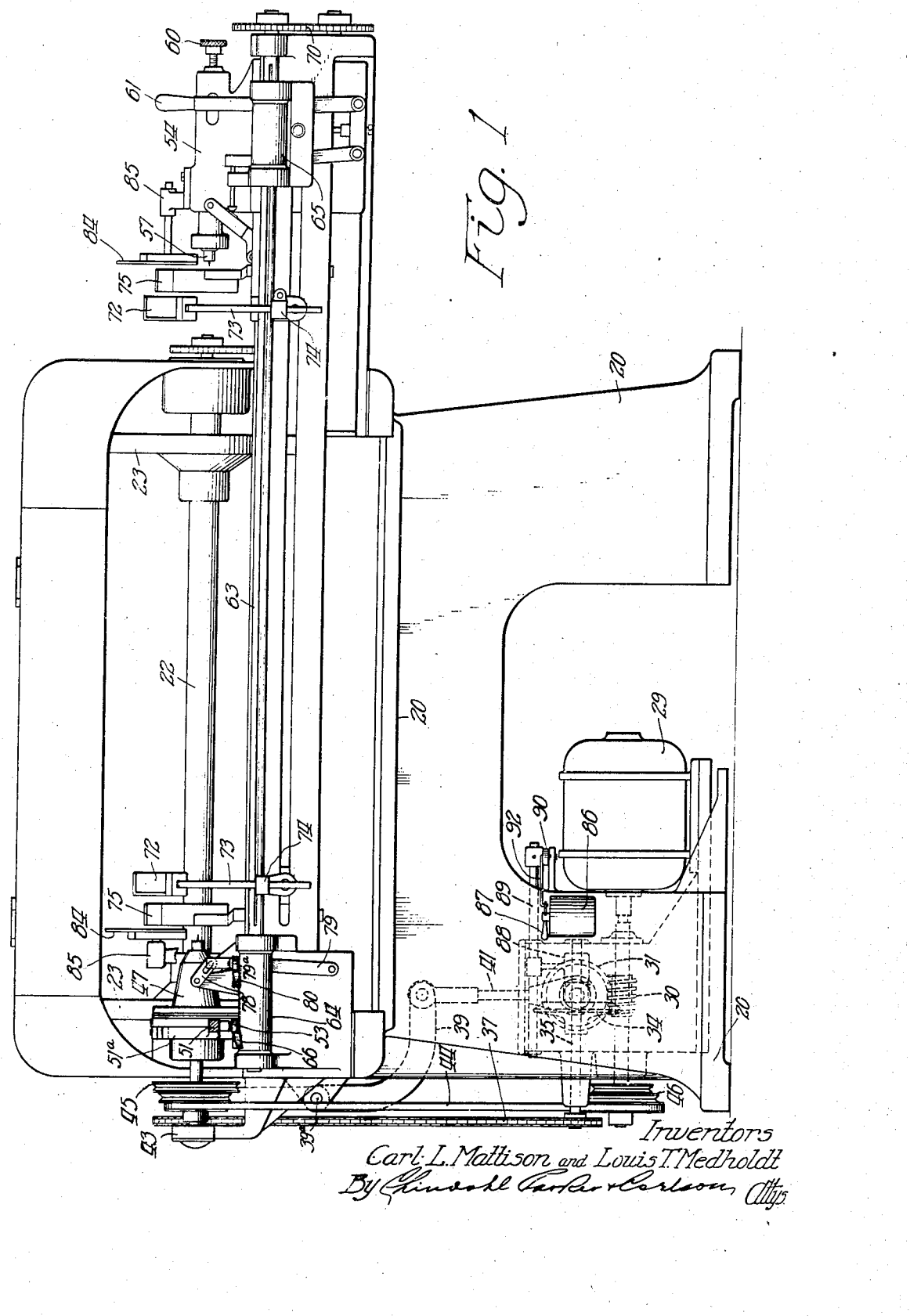
Figure 1 is a front side elevation of the complete machine.

The machine illustrated in the drawings and herein described in detail represents the preferred embodiment of our invention but it should be understood that this disclosure is merely illustrative as showing one manner of carrying the invention into effect and is not to be considered as any limitation of the invention of which this disclosure is an embodiment. The scope of the invention will be set forth in the appended claims.

*General description of machine*

The present machine comprises in general a base or frame in which is rotatably mounted an elongated drum-like structure comprising a pair of end heads connected by longitudinal rods on which are mounted a plurality of independent sanding units. Each of these units comprises a brush, a sand-paper facing therefor, a magazine containing a roll of sand-paper, the end of which provides the said facing for the brush, and means for clamping the brush and sand-paper and for adjustably fixing the unit as a whole in the desired position upon one of the said longitudinal rods of the drum.

The means for supporting and rotating the work comprises a head-stock and a tail-stock mounted at opposite ends of the machine at the front side thereof, means for rotating the headstock spindle including a friction clutch which drives the spindle only when a piece of work is pushed against the end of the spindle to operate the clutch, and means for automatically retracting the tail-stock center to release a piece of work supported by the head-stock and tail-stock centers and to permit the placement of a fresh piece of work in line with said centers, the said retracting means acting to cause the tail-stock center to engage the work when so presented and push it against the head-stock center for the purpose of rotatably clamping the work and actuating the clutch in the head-stock to set the work in rotation.

The means for automatically feeding the work to operative position and for discharging the work comprises an initial support for the work piece, a pair of forks located respectively adjacent to the head-stock and tail-stock and arranged to take the piece of work from said support and to center work in relation to the head-stock and tail-stock centers, and automatic means operating in timed sequence with relation to the movements of the tail-stock, as before described, to bring said forks into operative position when the tail-stock center is retracted and to withdraw said forks to an inoperative position as the centers of the head-stock and the tail-stock clamp the work and before the head-stock clutch is engaged. When the sanding operation is completed the work falls by gravity into a suitable receptacle upon retraction of the tail-stock center as before described.

Driving and timing mechanism is provided for rotating the drum and for actuating the mechanisms referred to in timed sequence so that as long as the pieces of work are kept supplied to the initial support either by the operator's hand or by a suitable magazine, the machine will continue to pick successive work pieces from said support, present them to the spindles, clamp the work, start the work in rotation and maintain it in rotation while the successive sanding devices on the drum are brought into engagement with the work, and finally release and discharge the work piece from the machine to complete the cycle automatically.

*The sanding mechanism*

Proceeding now with a detailed description of the embodiment of the invention shown in the drawings, the machine comprises a base or main supporting frame 20 in the upper end of which a drum-like structure 21 is rotatably mounted, said structure comprising a shaft 22 mounted in end bearings on the base and having fixed thereon a pair of end heads 23 which are rigidly connected by a plurality of longitudinal bars 24 located near the periphery of said heads.

On each one of the bars 24 is mounted a sanding unit designated generally as 25, each unit comprising a brush or broom 26 having a head with straws or bristles fixed therein and a sheet of sand-paper 27, the end section of which overlies the front or operative face of the broom and the remainder of which sheet is formed into a roll 27$^a$, the broom and sand-paper being secured in a holder 28 and the holder being adjustably secured upon its bar 24. It will be understood that one or more of the sanding units may be mounted on each of the bars 24, and that one or more sheets of sand-paper 27 may be associated with each brush 26.

The holder 28 comprises two separable complementary sections 28$^a$ and 28$^b$ which provide between them a generally cylindrical receptacle for the sand-paper roll 27$^a$, from which roll the end portion of the sheet passes between abutting ends of the two sections and extends over the face of the broom, said abutting end portions serving to clamp the sheet tightly between them. This clamping pressure is effected by a screw 28$^c$ threaded in a lug 28$^d$ on one section and bearing at its end against a lug 28$^e$ on the other section. This screw 28$^c$ serves as a means of securing the two sections together. The broom 26 is clamped in the holder and the holder as a whole is clamped to the bar 24 by providing a pocket in the holder section 28$^a$ and a thumb screw 28$^f$ having a conical inner end which enters said pocket and bears against the bar 24 thereby serving to draw down on the holder and grip the bar and the broom tightly.

Figure 3:
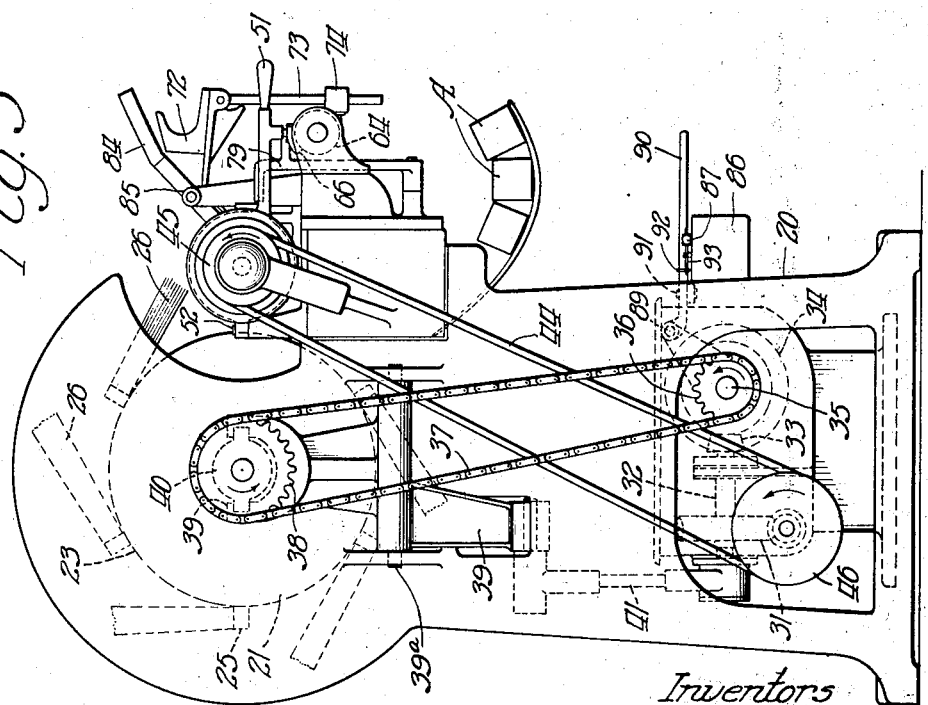
Fig. 3 is an end elevation of the machine looking at the left end of Fig. 1.

The drum 21 is arranged to be rotated slowly in a counter-clockwise direction as viewed in Fig. 3 by the following driving means. An electric motor 29 has a worm 30 fixed on its armature shaft which meshes with a worm wheel 31 fixed on a shaft 32, said shaft also having fixed thereon a bevel pinion 33 meshing with a bevel gear wheel 34 mounted on a stub shaft 35. On this stub shaft 35 is fixed a sprocket wheel 36 which drives a sprocket chain 37 running over a sprocket wheel 38 fixed on the drum shaft 22.

The drum 21 is also given a continuous oscillation along its axis to effect a relative movement of the sanding brooms lengthwise of the axis of the work for the purpose of providing a smoother and better finish upon the work. The means for effecting this oscillatory movement of the drum comprises a lever 39 pivoted at 39$^a$ on the machine frame, the upper end of said lever having a fork provided with bearings which receive diametrically opposed trunnions on a collar 40 fixed to the drum structure. The end of the lever 39 below its pivot extends inwardly through an opening in the machine base to provide a horizontally extending arm which is connected at its end by means of a link 41 to an eccentric mounted on the shaft 32 so that in the rotation of said shaft and eccentric the lever 39 will be rocked slightly and longitudinal reciprocation of the whole drum structure 21 will be effected.

*The headstock mechanism*

Referring now to the means for supporting and rotating a piece of work in position to be engaged by the sanding units 25, this means comprises a headstock at the left hand end of the machine and a tail stock at the right hand end of the machine, as viewed in Fig. 1, the headstock having a rotary driven center and the tail stock having a dead center, between which centers the ends of the work are clamped in a manner well known in the machine tool art.

Figure 2:
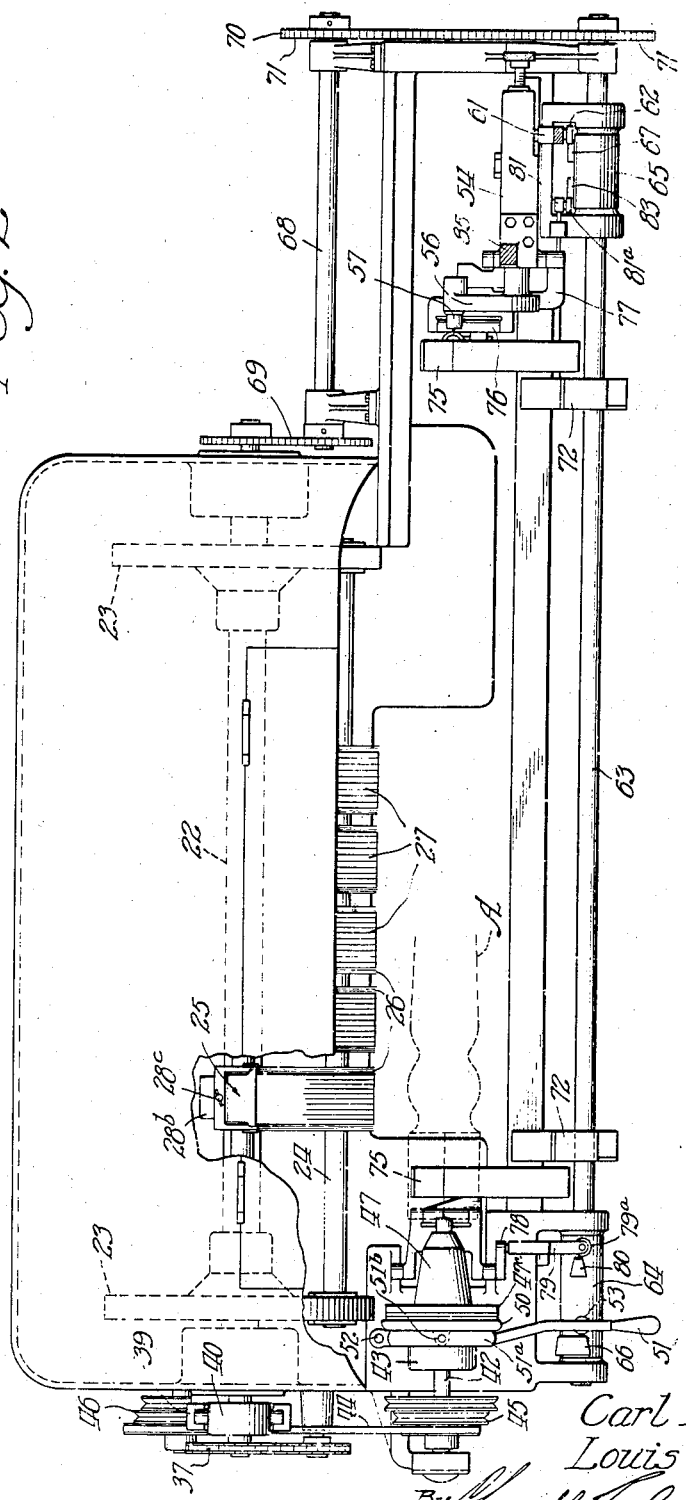
Fig. 2 is a plan view of the machine.
Figure 4:
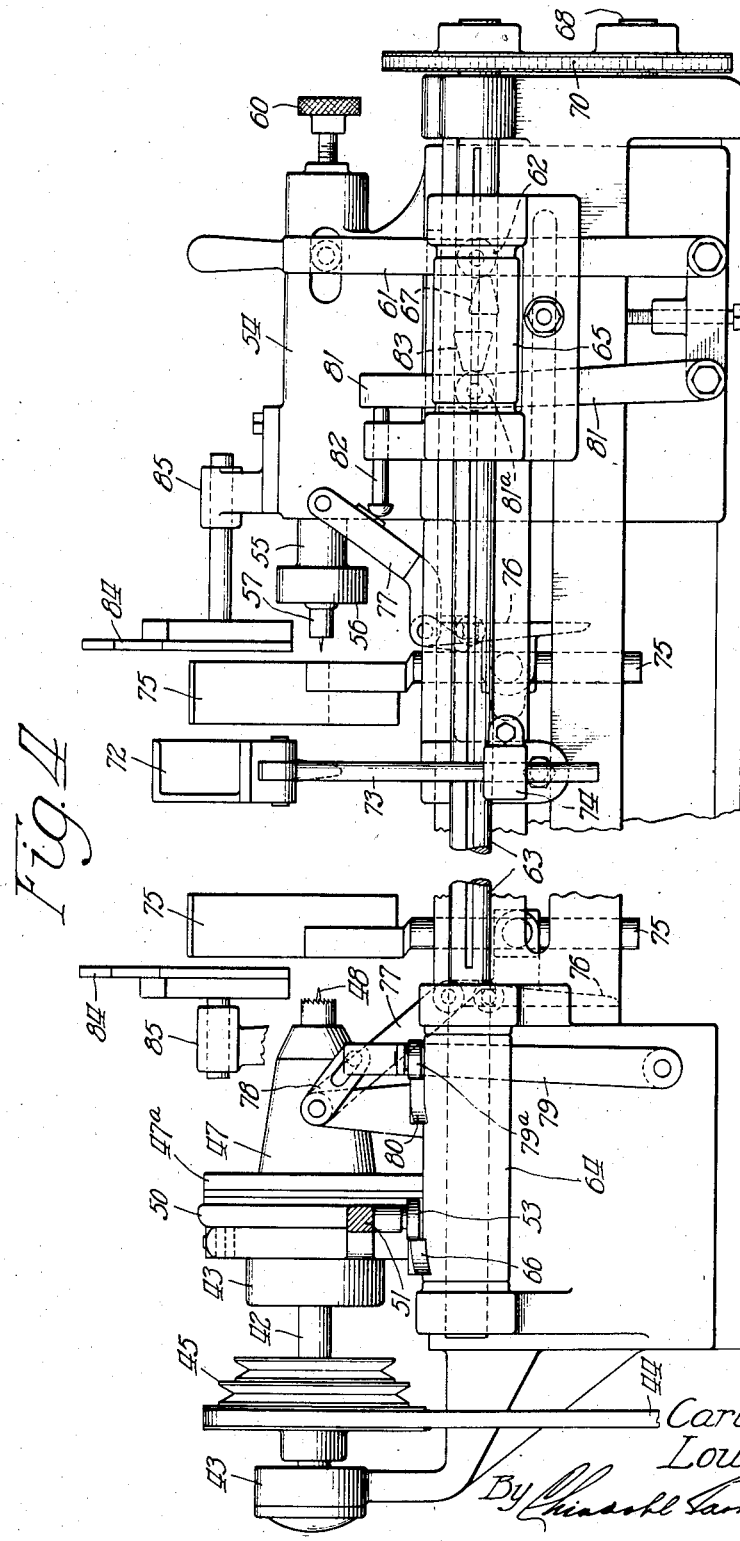
Fig. 4 is a front elevation on an enlarged scale illustrating the means for supporting and driving the work and for presenting the work to and discharging it from said supporting means.
Figure 5:
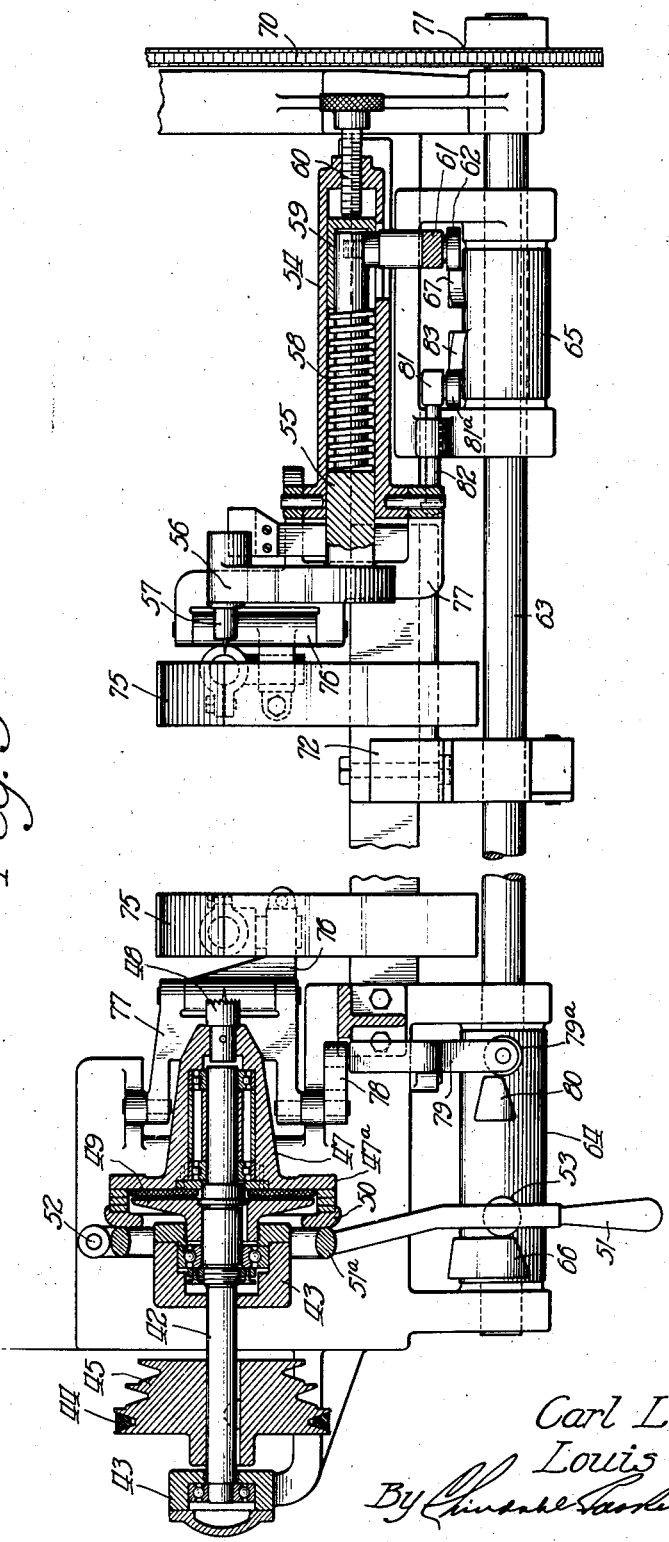
Fig. 5 is a plan view of the structure illustrated in Fig. 4 showing the headstock and tailstock in section.
Figure 6:
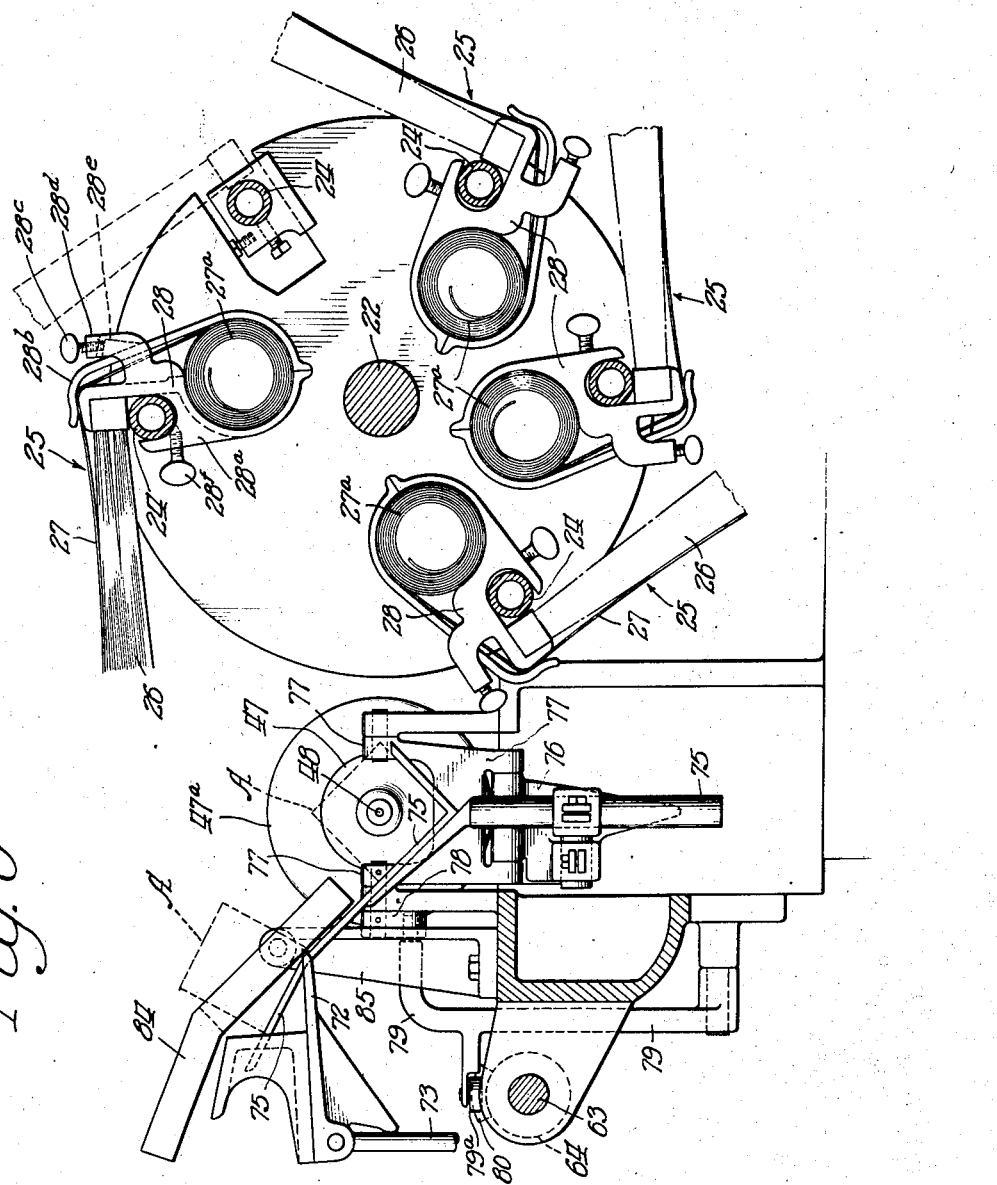
Fig. 6 is a view in cross section through the upper portion of the machine looking toward the headstock end (the left hand end in Fig. 1).
Figure 7:
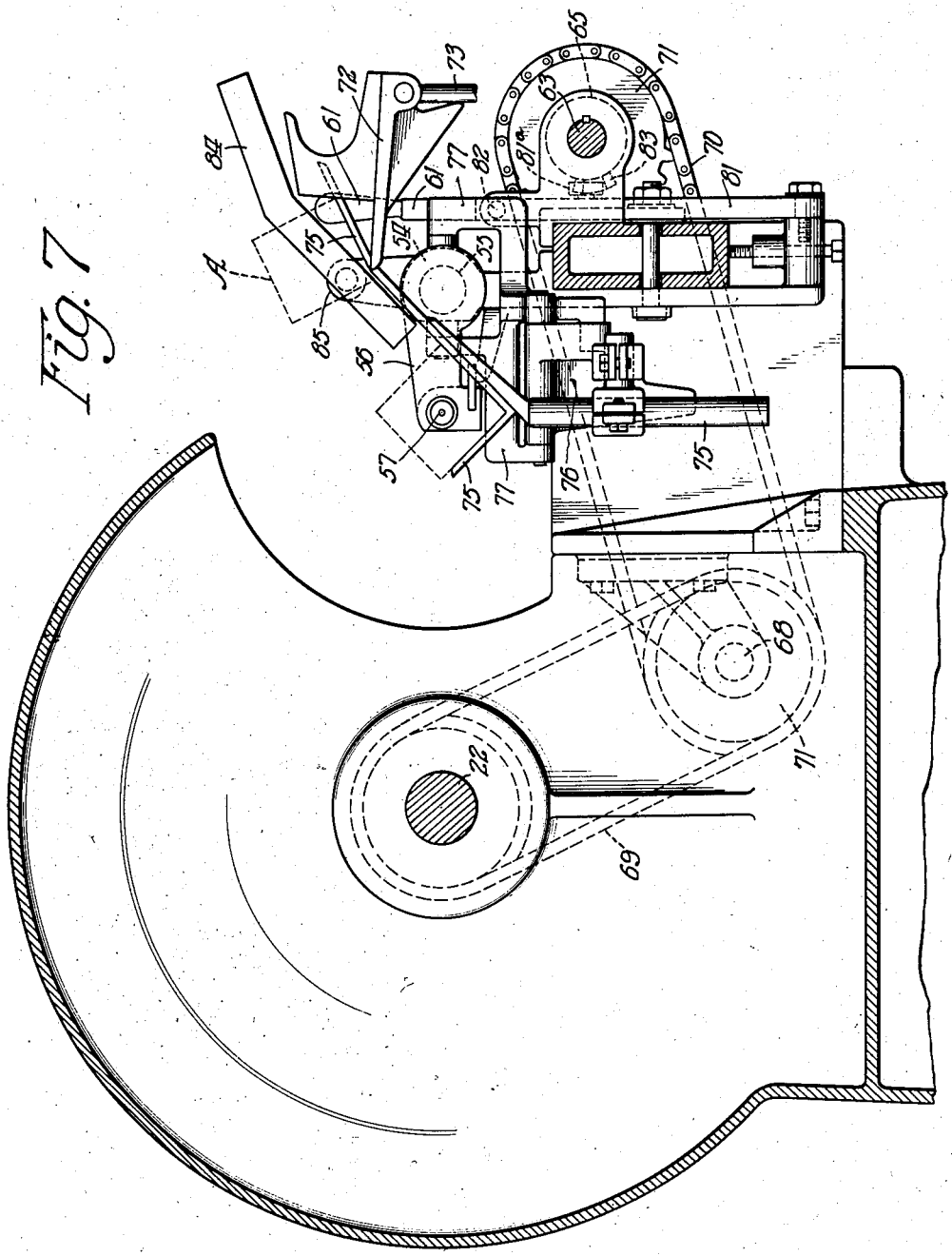
Fig. 7 is a view in cross section through the upper part of the machine looking toward the tailstock end (the right hand end in Fig. 1) and omitting the sanding drum structure.

The headstock mechanism will be first described. It comprises a rotary spindle 42 mounted in bearings 43 on the machine frame and driven by a belt 44 running over cone pulleys 45 and 46 fixed respectively on said spindle and on the armature shaft of the motor 39. A head 47 carrying a driving center 48 is rotatably mounted on the spindle 42 and has a radial flange 47ª arranged to be frictionally engaged by a friction driving disk 49 which is fixed to the spindle 42. The head 47 is arranged to have a sufficient endwise movement on the spindle to separate the flange 47ª from its friction driving disk to disengage the driving connection with the head. Movement of the head 47 into driven engagement with the disk 49 is automatically effected when a piece of work is clamped between the head and tailstock centers as will be more fully described. Braking means is provided for quickly stopping rotation of the head 47 which means comprises an annular friction brake element 50 surrounding the friction driving disk 49 and arranged to be moved laterally into braking engagement with the head 47. For effecting this movement such means as a lever 51 is pivoted on a stationary pivot 52 and has a ring portion 51ª pivotally connected to opposed studs 51ᵇ (Figs. 2 and 4) on the brake element 50 whereby to move the element into engagement with the head 47 when the lever 51 is swung to the right as viewed in Fig. 5. The lever 51 carries a roller stud 53 which is arranged to be periodically engaged by a rotary cam to be later described for the purpose of automatically applying the brake to stop rotation of the head 47.

The tail stock mechanism

The tail stock comprises a cylinder 54 stationarily mounted on the machine frame, and a plunger 55 slidable in said cylinder and having fixed on its outer end a cross head 56 which carries a dead center 57 spaced horizontally from the cylinder axis in a direction toward the axis of the drum 21. A coiled spring 58 within the cylinder 54 surrounds a reduced portion of the plunger 55 and exerts its pressure between a shoulder on said plunger and a sleeve 59 slidably mounted in the rear end of the cylinder and shiftable therein by means of a tensioning screw 60 to vary the tension on said spring. This spring thus exerts constant pressure tending to move the tail stock center 57 toward the headstock center 48 with which it is alined. A vertical lever 61 pivoted at its lower end to a stationary part on the machine frame is provided with a connecting element which passes through a slot in the cylinder 54 and engages the plunger 55, said lever having at its upper end a handle by which the operator may manually pull the plunger 55 back into its cylinder and withdraw the center 57 from work-supporting position. The lever 61 also carries a roller stud 62 intermediate its ends which is in position to be engaged by a rotary cam to be presently described by which the lever is automatically moved to the right as viewed in Fig. 1 for the purpose of withdrawing the center 57 to release the work at the proper time.

It will be noted that the entire tail stock mechanism is mounted on a bracket or table which projects beyond one end of the machine frame and beyond the sanding drum structure 21 so that extra long pieces of work may be supported and the tail stock is completely out of the way of the sanding units 25 which may be mounted at the extreme right-hand end of the drum as viewed in Fig. 1.

The timing cam mechanism

A rotary shaft 63 extends horizontally along the front of the machine and has fixed thereon two cam cylinders 64 and 65 located respectively in front of the headstock and tailstock mechanism. The cam drum for the headstock has a cam projection 66 thereon arranged to engage the roller stud on the brake applying lever 51 and the cam cylinder opposite the tail stock has a cam projection 67 arranged to engage the roller stud 62 on the hand lever 61 to retract the tail stock center 57 from work-supporting position.

The cam shaft 63 is driven from the sanding drum shaft 22 through the medium of a countershaft 68 which is connected by a sprocket chain 69 to the said drum shaft and at its other end is connected to the cam shaft 63 by a sprocket chain 70 running over sprocket wheels 71.

The work feeding mechanism

Two stationary brackets 72 are mounted at the front side of the machine adjacent to the headstock and tailstock respectively for supporting opposite ends of a piece of work designated A. The piece of work shown in the drawings has squared ends and an intermediate portion of circular cross section of varying diameters. The brackets 72 are pivoted to upright pins 73 which are adjustably mounted in clamps 74 on the machine frame and the brackets are arranged to be swung around to hang in front of the pins 73 so as to be out of the operator's way when desired. Work presenting means is provided for automatically picking up a piece of work from the brackets 72 and centering the work in relation to the headstock and tailstock centers readily to be clamped between said centers. Said work presenting means comprises V-shaped carriers 75 the forward arm of the V being elongated so that when the carriers are elevated these elongated arms will pick off a piece of work from the brackets 72 and cause the work to roll or slide down to the bottom of the V. Each carrier is mounted for vertical and horizontal adjustment in a hanger 76 which is suspended or pivotally supported from the lower end of a link 77, the latter being stationarily pivoted at its upper end to a suitable support. The means for elevating the carriers 75 at opposite ends of the machine are similar but differ slightly. At the headstock end an arm 78 fixed with relation to the link 77 has a slot therein which receives a lateral projection on the upper end of a vertical arm 79 which is pivoted at its lower end on a fixed pivot, said arm 79 carrying at its upper end a roller 79ª which is arranged to be engaged by a cam projection 80 on the cam drum 64 so that at a predetermined time the carrier 75 will be elevated and as soon as the cam 80 passes will descend by its own weight.

The carrier operating means at the tailstock end of the machine comprises a vertical arm 81 carrying at its upper end a pin 82 arranged to abut against the depending link 77, said vertical arm also carrying a roller stud 81ª arranged to be engaged by a cam projection 83 on the cam cylinder 65 so that the work carrier 75 will be periodically raised by the cam 83 and will descend by gravity after the cam has passed the roller.

A pair of stationary guides 84, mounted respectively adjacent to the headstock and tailstock, coact with the supporting brackets 72 to position the work and to guide the work as it is carried from the brackets 72 into position to be clamped by the work centers. The said guides 84 are carried by pins which are adjustably mounted in brackets 85.

Drive control means

The main driving motor 29 is controlled by a suitable rheostat or starting box 86, (Figs. 1, 3 and 8) which has a control lever 87. Suitable means is provided for disengaging the drive for the sanding drum structure 21 without interfering with the drive to the headstock spindle. While this means may take various forms, it is herein shown as comprising a clutch device 88 of any common form which is arranged to connect the shaft 35 to the bevel gear 34 for driving or releasing the latter as may be desired. The clutch device is actuated by a rod 89, one end of which is attached to a hand lever 90 pivoted at 91 (Fig. 8) and connected by a link 92 to a lever 93 which has one end located in position to be engaged by the motor starting lever 87. By moving this starting lever 87 in opposite directions from the full line position seen in Fig. 8 the motor may be driven in either direction as may be desired. If the starting lever is moved to the left, the motor will be driven in the direction to rotate the drum structure 21 and the headstock spindle in a counterclockwise direction as viewed in Fig. 3. It is sometimes desirable, however, to be able to rotate the headstock spindle in the opposite direction for the purpose of permitting the operator to perform an operation with a lathe tool upon a piece of work held by the centers, and in such a case it is desirable to insure that the rotation of the sanding drum structure will be prevented during such operation. The means above described accomplishes this result because when the motor starting lever 87 is moved to the right to reverse the motor, said lever engages the lever 93 and through the parts connected therewith disengages the clutch device 88 and prevents rotation of the drum structure. By means of the hand lever 90 the operator may also stop rotation of the drum structure any time he desires without operating the motor starting lever 87.

Operation of the machine

In operation let it be assumed that the cam 66 is holding the brake operating lever in brake applied position and that the cam 67 is in position holding the tailstock center 57 in retracted position, the cams 80 and 83 will have by this time elevated the work carriers 75 to pick off the piece of work from the supporting brackets 72 and present the work in alinement with the headstock and tailstock centers.

As soon as the cams 66 and 67 pass out of engagement with the roller studs on the brake lever and tailstock retracting lever respectively, the brake will be released and the tailstock center pressed forward to engage one end of the work piece and press the other end against the headstock center, thereby shifting the head 47 to carry its flange 47ᵃ into frictional engagement with the driving disk 49, thus setting the headstock center and therefore the work piece in rotation. Simultaneously with this engagement of the centers with the work, the cams 80 and 83 will have moved out of position to permit descent of the work carriers 75 so that they will be out of the way before the rotation of the work begins.

Since the headstock is driven directly from the driving motor and the sanding drum is driven by reduction gearing, the piece of work will be rotated very rapidly while the drum rotates very slowly and in the rotation of the drum the sanding units 25 will be successively carried into engagement with the work. Since the broom backing for the sand paper is very flexible it will conform to the irregular shape or varying diameters of the work so that the sand paper will be firmly pressed down into the grooves in the work, as well as the convex faces. Also the endwise oscillation or reciprocation of the sanding drum will cause the sand paper to continuously shift lengthwise of the work so that there will be no circular scratches or depressions made in the work by the sand paper.

We claim as our invention:

1. An abrading machine comprising, in combination, means for rotatably supporting a piece of work, a rotary carrier, a plurality of sanding units mounted on said carrier and arranged to be successively brought into engagement with the work, and means for independently and adjustably mounting said units on said carrier to adapt said machine for operation on various types of work pieces, each of said units comprising a broom a flexible rolled strip of abrading sheet material the end of which is backed by said broom, and a support forming a part of each unit for carrying the roll of that unit, each of said supports being removable and adjustable as a part of its sanding unit.

2. An abrading machine comprising, in combination, a pair of centers for supporting and rotating a piece of work, means for applying an abrading element to the rotating work, friction means for driving one of said centers and arranged to be set in operation by pressure of the work against such center, braking means for stopping rotation of said driven center, means applying pressure to the opposing center to place the work against said driven center, the latter means being retractable to release the work and mechanism for automatically actuating the braking means and for retracting said retractable center against the action of its placing means to effect successively the clamping and rotating of a piece of work and the release and discharge thereof from said centers.

3. An abrading machine comprising, in combination, a rotary drum-like structure having a plurality of longitudinal bars disposed about its periphery and a plurality of sanding units mounted on the respective bars for adjustment both longitudinally and rotatably on the bars, each of said units comprising a broom-like backing, a sheet of sand-paper having one end section underlying said backing and the remainder of the sheet coiled into a roll and means exerting a clamping pressure upon said backing and upon said bar to secure the backing in place and to adjustably fix the unit on the bar, the last mentioned means providing a receptacle for said sand-paper roll and also providing means for clamping the sand-paper sheet.

4. An abrasive unit comprising, in combination, a broom, a sheet of sand-paper having one end overlying one face of said broom and its other end coiled into a roll and means for supporting said broom and sand-paper, said means providing a receptacle for said roll, a clamp for said broom and means to secure the unit as a whole upon a carrier.

5. In a sanding machine the combination of a headstock spindle and a tailstock spindle both mounted rotatably and for limited longitudinal movement on a fixed axis, and disconnectible driving means for said headstock spindle rendered operative by longitudinal movement of said headstock spindle when a piece of work is clamped between the spindles.

6. In a sanding machine the combination of a headstock spindle and a tailstock both mounted rotatably and for limited longitudinal movement on a fixed axis, disconnectible driving means for said headstock spindle rendered operative by longitudinal movement of said headstock spindle when a piece of work is clamped between the spindles, and automatically operable means to actuate the tailstock spindle to clamp and unclamp work pieces between the spindles.

7. In a sanding machine the combination of a headstock spindle and a tailstock both mounted rotatably and for limited longitudinal movement on a fixed axis, disconnectible driving means for said headstock spindle rendered operative by longitudinal movement of said headstock spindle when a piece of work is clamped between the spindles, automatically operable means to actuate the tailstock spindle to clamp and unclamp work pieces between the spindles, and means operable when said tailstock spindle is moved to release the work to disconnect said driving means and stop rotation of said headstock spindle.

8. A machine of the character described comprising, in combination, work supporting means rotatable on a fixed axis, a plurality of sanding units, a carrier for said units arranged to move said units along an endless path and successively into operative engagement with the work, and means operable selectively to move said carrier and said work supporting means so that the engaging surfaces of the units and work move in opposite directions, or to rotate said work supporting means in the opposite direction while said carrier remains stationary.

9. A machine of the character described comprising in combination, work supporting means rotatable on a fixed axis, a plurality of sanding units, a carrier for moving said units along an endless path and successively into engagement with the work, reversible actuating means for rotating said work supporting means in opposite directions, a disconnectible drive between said actuating means and said carrier, and a control for reversing said actuating means operable to disconnect said drive when said work supporting means is rotated in one direction.

LOUIS T. MEDHOLDT.
CARL LAWRENCE MATTISON.